(12) United States Patent
Abe et al.

(10) Patent No.: US 7,687,195 B2
(45) Date of Patent: Mar. 30, 2010

(54) NONAQUEOUS ELECTROLYTE SECONDARY BATTERY AND PRODUCING METHOD THEREOF

(75) Inventors: Takeshi Abe, Tokushima (JP); Syuichi Yamashita, Tokushima (JP); Hiroyuki Suzuki, Hyogo (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 1116 days.

(21) Appl. No.: 11/328,065

(22) Filed: Jan. 10, 2006

(65) Prior Publication Data
US 2006/0154137 A1 Jul. 13, 2006

(30) Foreign Application Priority Data
Jan. 13, 2005 (JP) .............................. 2005-006121

(51) Int. Cl.
*H01M 2/18* (2006.01)
(52) U.S. Cl. .................. 429/130; 429/163; 429/164; 429/175; 429/176
(58) Field of Classification Search .............. 428/163, 428/164, 166, 175, 176; 429/163, 164, 166, 429/175, 176
See application file for complete search history.

(56) References Cited

U.S. PATENT DOCUMENTS 6,838,207 B1 * 1/2005 Sugita ......................... 429/82
6,869,725 B2 3/2005 Iwanaga et al.

2007/0105016 A1 * 5/2007 Chang et al. ................ 429/174

FOREIGN PATENT DOCUMENTS

| JP | 9-283111 | 10/1997 |
|---|---|---|
| JP | 9-283112 | 10/1997 |
| JP | 2003-229177 | 8/2003 |

* cited by examiner

*Primary Examiner*—Jane Rhee
(74) *Attorney, Agent, or Firm*—Westerman, Hattori, Daniels & Adrian, LLP

(57) ABSTRACT

The present invention provides for a nonaqueous electrolyte secondary battery and a producing method therefor, in which a grooved portion provided in an upper portion of the outer casing of the nonaqueous electrolyte secondary battery protrudes toward the inner portion of the outer casing, a group of electrodes being housed in the outer casing, a positive electrode and a negative electrode being wound in a spiral manner while facing each other through a separator in the group of electrodes, and a sealing member is placed on the upper portion of the grooved portion through insulated packing to seal the opening of the outer casing in an airtight manner, and whereby a circular insulating plate 10 provided with an arced opening 12 and cut portions 13 and 14 is arranged between the upper portion of the group of electrodes and the lower surface of the grooved portion, the cut portions 13 and 14 extending from end portions 12a and 12b of the opening 12, and the inner peripheral side of the cut portions 13 and 14 of the circular insulating plate is raised from the outer peripheral side of the cut portions 13 and 14. Such insulating plate does not adversely affect the injection property of the electrolytic solution used in producing the nonaqueous electrolyte secondary battery as to provide it with excellent battery performance and excellent productivity.

10 Claims, 6 Drawing Sheets

NONAQUEOUS ELECTROLYTE SECONDARY BATTERY AND PRODUCING METHOD THEREOF

BACKGROUND OF THE INVENTION

1. Field of the Invention

The present invention relates to a nonaqueous electrolyte secondary battery and a producing method therefor. In the nonaqueous electrolyte secondary battery of the invention, a grooved portion is provided in the upper portion of the outer casing thereof to protrude toward the inner portion of the outer casing in which a group of electrodes is housed, while a positive electrode and a negative electrode facing each other through a separator in the group of electrodes are wound to form a spiral, and a sealing member is placed on the upper portion of the grooved portion by means of insulated packing to seal the opening of the outer casing in an airtight manner.

2. Description of Prior Art

Nonaqueous electrolyte secondary batteries, typified by light lithium secondary batteries with high energy density, have come to be used as a power source for portable information terminals such as portable telephones and Personal Digital Assistants (PDAs), notebook personal computers, and digital cameras. A lithium secondary battery is typically produced by dissolving a negative electrode active material containing natural graphite, a binder, and the like in an organic solvent to form slurry or paste, and the slurry or paste is applied to a negative electrode core body made of copper foil or the like to produce a negative electrode. On the other hand, organic solvent, a carbon conductive material, and a positive electrode active material containing $LiCoO_2$, $LiNiO_2$, $LiMnO_2$, $LiMn_2O_4$, and the like are mixed together to form slurry or paste, and the slurry or paste is applied to a positive electrode core body made of aluminum foil or the like to produce a positive electrode.

After the positive electrode and the negative electrode are superposed on each other while sandwiching a separator formed by a polyethylene fine porous film therebetween, the positive electrode, the negative electrode and the separator are wound together by a winding apparatus, and the outermost periphery thereof is secured with tape to form a spiral electrode group. Then, after the spiral electrode group is inserted into an outer casing, a negative electrode lead (negative electrode collector tab) connected to the negative electrode and a inner bottom surface of the outer casing are connected to each other, and a positive electrode lead (positive electrode collector tab) connected to the positive electrode and a positive electrode terminal are connected to each other. A nonaqueous electrolytic solution is then injected into the outer casing, which is sealed in an airtight manner to produce the lithium secondary battery. In the nonaqueous electrolytic solution, electrolytic salt is added to the organic solvent (for example, a mixture solvent containing ethylene carbonate (EC) and dietyl carbonate (DEC)).

In recent years, the demand for lithium secondary batteries with higher capacity has increased because of improvement in the performance of electronic instruments. For example, higher capacity can be achieved by improving the packing density of the electrode active material layer. Such method however adversely affects the ability of the nonaqueous electrolytic solution to penetrate the active material layer or be impregnated therein. In other words, the nonaqueous electrolytic solution does not spread widely in the electrode, which causes deterioration in battery characteristics.

The decrease in volume of the nonaqueous electrolytic solution to penetrate or impregnate the active material layer leads to decrease in productivity, as to worsen production yield of the battery. Further, in this kind of lithium secondary battery, disk-shaped circular insulating plates provided with a hole approximately in the center portion thereof are usually arranged at the upper and lower end faces of the group of electrodes. Because the hole occupies a relatively small area of the circular insulating plate, the entire upper end face of the group of electrodes is substantially covered by the circular insulating plate, which obstructs the movement of the nonaqueous electrolytic solution, thereby further diminishing the degree of penetration or impregnation of the active material layer by the nonaqueous electrolytic solution.

For example, Japanese Laid-Open Patent Nos. H9-283111 and H9-283112 proposed to address the above problems. Japanese Laid-Open Patent No. H9-283111 proposed that the impregnation property of the nonaqueous electrolytic solution can be improved by arranging in the upper portion of the group of electrodes housed in the outer casing an insulating plate having at least one cutout portion in an outer periphery thereof.

In Japanese Laid-Open Patent No. H9-283112, the insulating plate, which has a center plane portion, an annular wall formed near the outer periphery of such center plane portion, and a collar portion formed in the outer periphery of the annular wall, is arranged in the upper portion of the group of electrodes housed in the outer casing. The center plane portion has a through-hole, through which the electrode lead is inserted in the middle of the center plane portion, and the center plane portion also has several through-holes in the periphery thereof. The collar portion has a number of through-holes, and the bottom surface of the collar portion is located on the side where the group of electrodes resides at the bottom surface of the center plane portion. The bottom surface of the annular wall is located in the same plane as the bottom surface of the center plane portion, or the bottom surface of the annular wall is located at the midpoint between a bottom surface portion of the collar portion and the bottom surface portion of the center plane portion. Pursuant to this structure, the time for infusing the nonaqueous electrolytic solution can be shortened.

However, using the means proposed in either Japanese Laid-Open Patent No. H9-283111 or No. H9-283112 does not bring about any improvement in the impregnation ability of the nonaqueous electrolytic solution, while actually causing diminution in battery characteristics and decrease in production yield. In the recent type of lithium secondary batteries, a center pin is arranged to be inserted in a hollow area formed in the central axis region of the spiral electrode group to prevent deformation of the hollow area due to charging and discharging and to ensure the passage of gas exhaust.

However, there was caused the problem that the center pin arranged to be inserted in the hollow portion formed in the central axis region of the spiral electrode group protrudes by pressing force from the spiral electrode group. To avoid this problem, the circular insulating plate, which has not been provided with a hole at the center thereof, is used. As shown in FIG. 5, in a circular insulating plate 30 with no hole, a portion 30*a* corresponding to the central axis region of the spiral electrode group is formed so as to cover the same, and a semicircular arced opening 32 is provided around the portion 30*a*.

When the portion 30*a* corresponding to the central axis region of the spiral electrode group is formed such as to cover the same, the upper portion of the center pin arranged to be inserted in the hollow area formed in the middle of the spiral electrode group is covered with the portion 30*a* of the circular insulating plate 30 corresponding to the central axis region of the spiral electrode group as shown in FIG. 6, so that the center pin will not protrude.

However, when the upper portion of the hollow area formed in the central axis region of the spiral electrode group is covered with the portion 30a of the circular insulating plate 30 corresponding to the central axis region of the spiral electrode group, a path for the nonaqueous electrolytic solution to penetrate the central axis region of the spiral electrode group cannot be ensured during injection of the nonaqueous electrolytic solution. Accordingly, the process of penetrating each electrode in the group of electrodes takes enormous time, and the injection property of the nonaqueous electrolyte solution deteriorates, which worsens production yield while at the same time causing productivity to be diminished in this kind of nonaqueous electrolytic solution battery.

In view of the foregoing, the invention has been conceived to provide a nonaqueous electrolyte secondary battery having excellent battery performance and excellent productivity and a producing method therefor with the use of a circular insulating plate which prevents the injection property of the nonaqueous electrolytic solution from being adversely affected.

SUMMARY OF THE INVENTION

In order to achieve the above object, the present invention provides for a nonaqueous electrolyte secondary battery in which a grooved portion is provided in the upper part of an outer casing and formed toward the inner portion thereof, where a group of electrodes is housed in the outer casing, a positive electrode and a negative electrode being spirally wound while facing each other through a separator in the group of electrodes, and a sealing member is placed on the upper part of the grooved portion through an insulated packing to seal the opening of the outer casing in an airtight manner, wherein a circular insulating plate provided with an opening and a cut portion is arranged between the upper region of the group of electrodes and the lower surface of the grooved portion, the cut portion extending from an end portion of the opening, and an inner peripheral side of the cut portion of the circular insulating plate is raised from an outer peripheral side thereof.

Thus, the circular insulating plate has an opening and the cut portion extends from the end portion of the opening, and the inner peripheral side of the cut portion of the circular insulating plate is raised from the outer peripheral side thereof, which allows the penetration path of the electrolytic solution to be formed between the circular insulating plate and the upper region of the group of electrodes. Therefore, the penetration path of the electrolytic solution can be secured in the central axis region of the spiral electrode group as to improve its immersion property.

While the opening is formed in the shape of a semi-circular arc, the inner periphery of the opening is formed in such manner as to cover a portion corresponding to the central axis region of the group of electrodes. This prevents the center pin from protruding when the tubular center pin is arranged to be inserted in the central axis region of the group of electrodes. In this case, it is preferable that the cut portion be formed so as to extend radially toward both sides from end portions of the semicircular arced opening along the outer periphery of the opening, or that the cut portion be formed so as to linearly extend from one end portion of the inner periphery of the semicircular arced opening.

In producing the nonaqueous electrolyte secondary battery of the invention, the producing method thereof includes a housing step, whereby the group of electrodes is housed in the outer casing after arranging a circular insulating plate provided with a semicircular arced opening and a cut portion, the semicircular arced opening being located in the upper region of the group of electrodes, and the cut portion extending from an end portion of the semicircular arced opening, a grooving step, whereby a grooved portion is formed at approximately the same height from the outer bottom surface of the outer casing where the circular insulating plate is arranged in the upper portion of the outer casing in which the group of electrodes is housed, and the grooved portion protrudes toward the inner portion of the outer casing from the outer portion thereof, and a sealing step of caulking a sealing portion of the outer casing after a sealing member is placed in the upper portion of the grooved portion through insulated packing.

BRIEF DESCRIPTION OF THE DRAWINGS

FIG. 2 is arranged in the upper region of the group of electrodes and inserted into an outer casing.

DESCRIPTION OF THE PREFERRED EMBODIMENT

Figure 1:
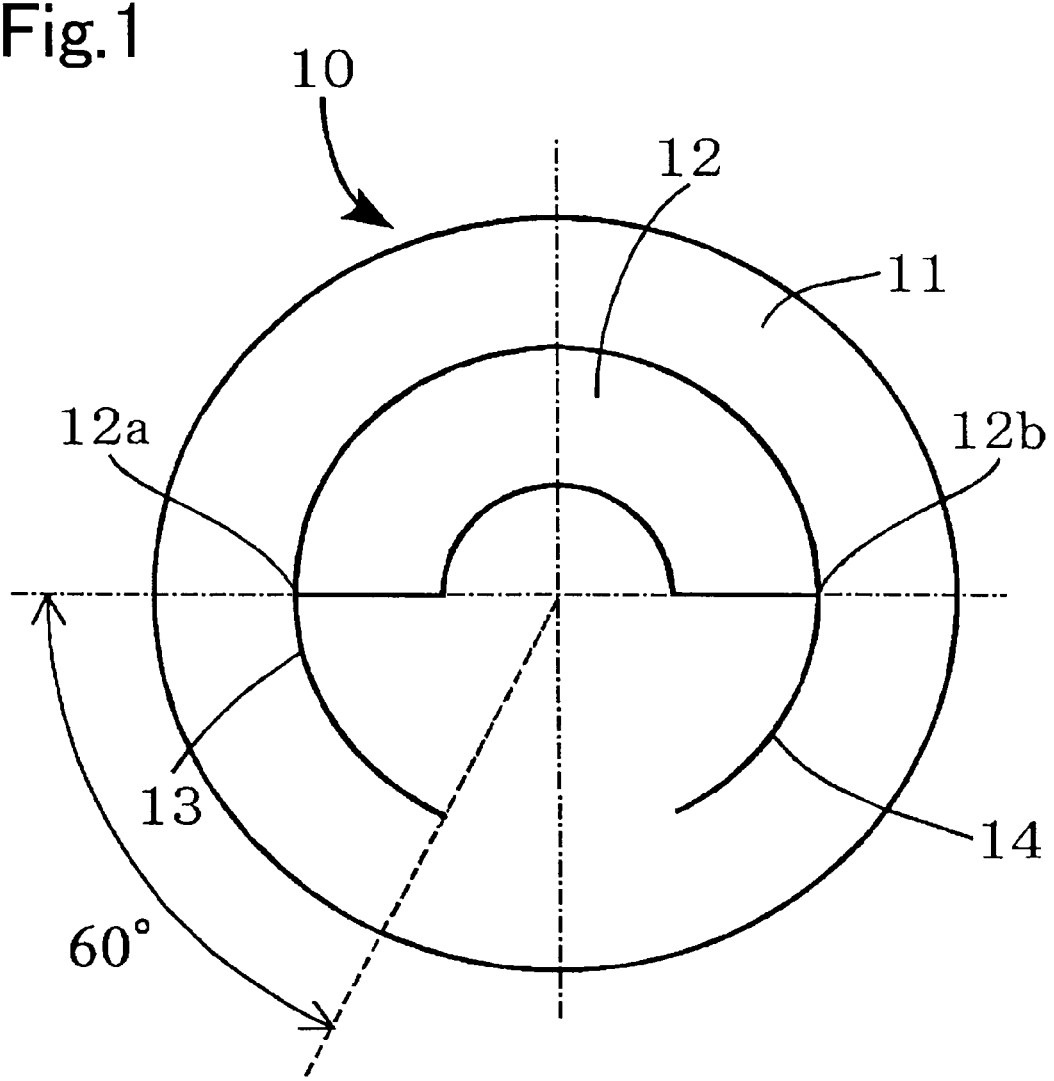
FIG. 1 is a plane view schematically showing the circular insulating plate of Example 1 used in the nonaqueous electrolyte secondary battery of the invention.
Figure 2:
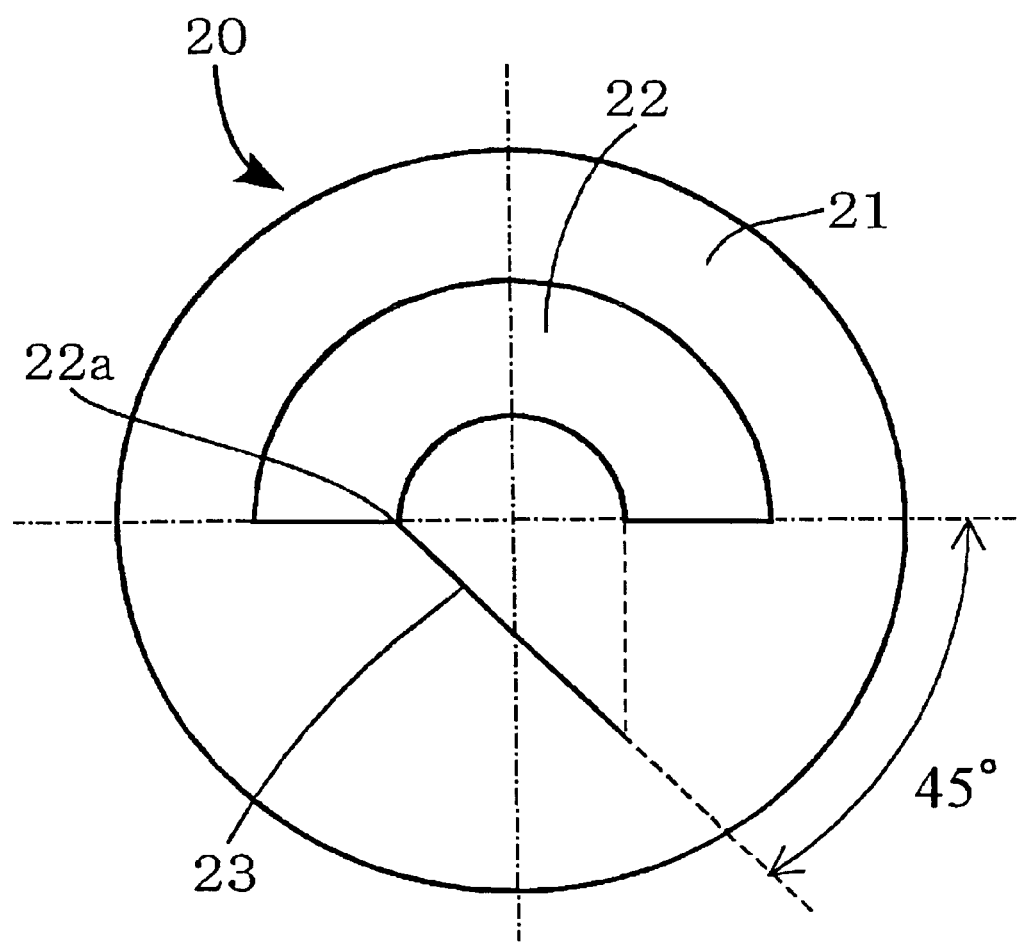
FIG. 2 is a plane view schematically showing the circular insulating plate of Example 2 used in the nonaqueous electrolyte secondary battery of the invention.
Figure 3:
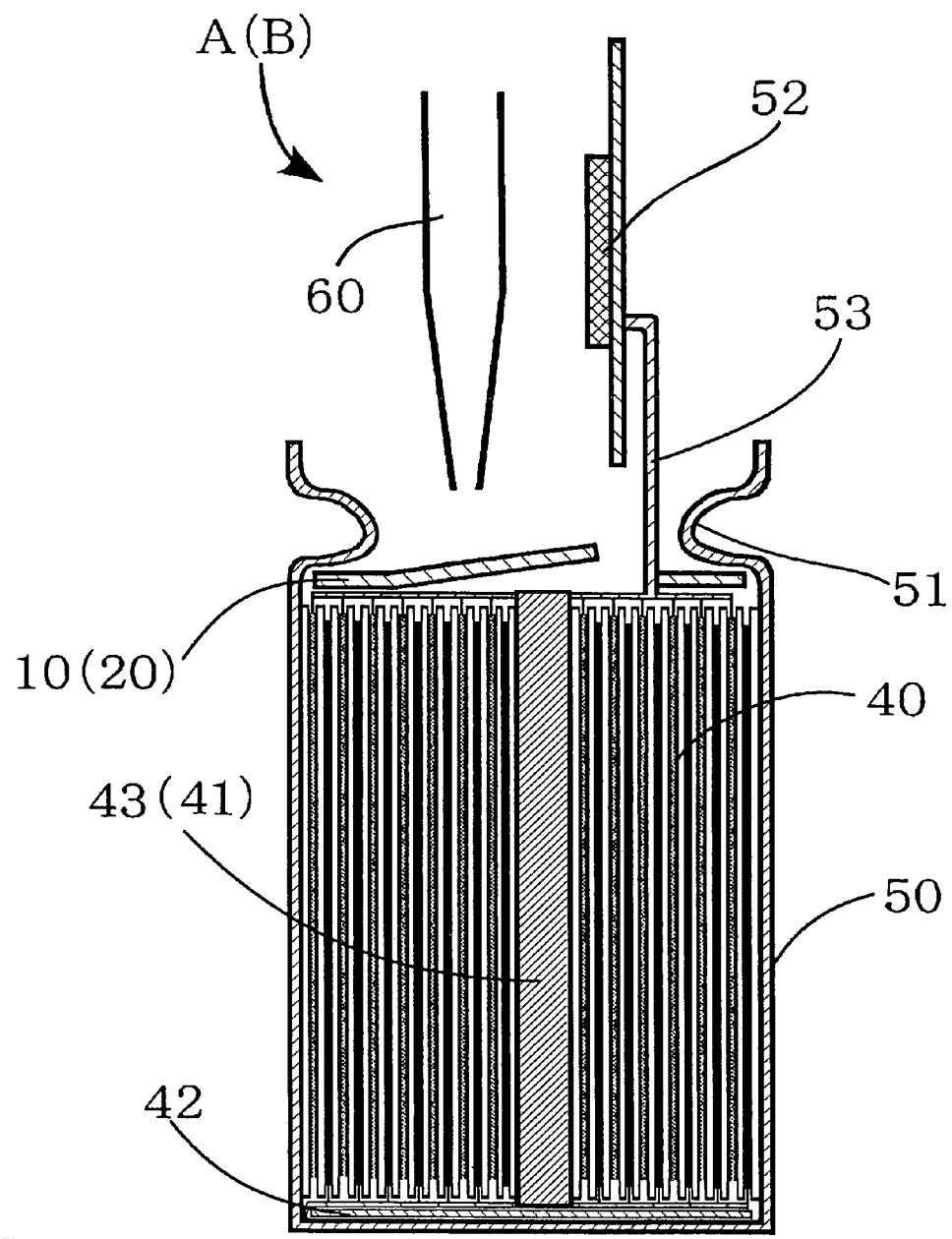
FIG. 3 is a sectional view schematically showing the state in which an electrolytic solution is injected into the outer casing while the circular insulating plate referred to in FIG. 1
Figure 4:
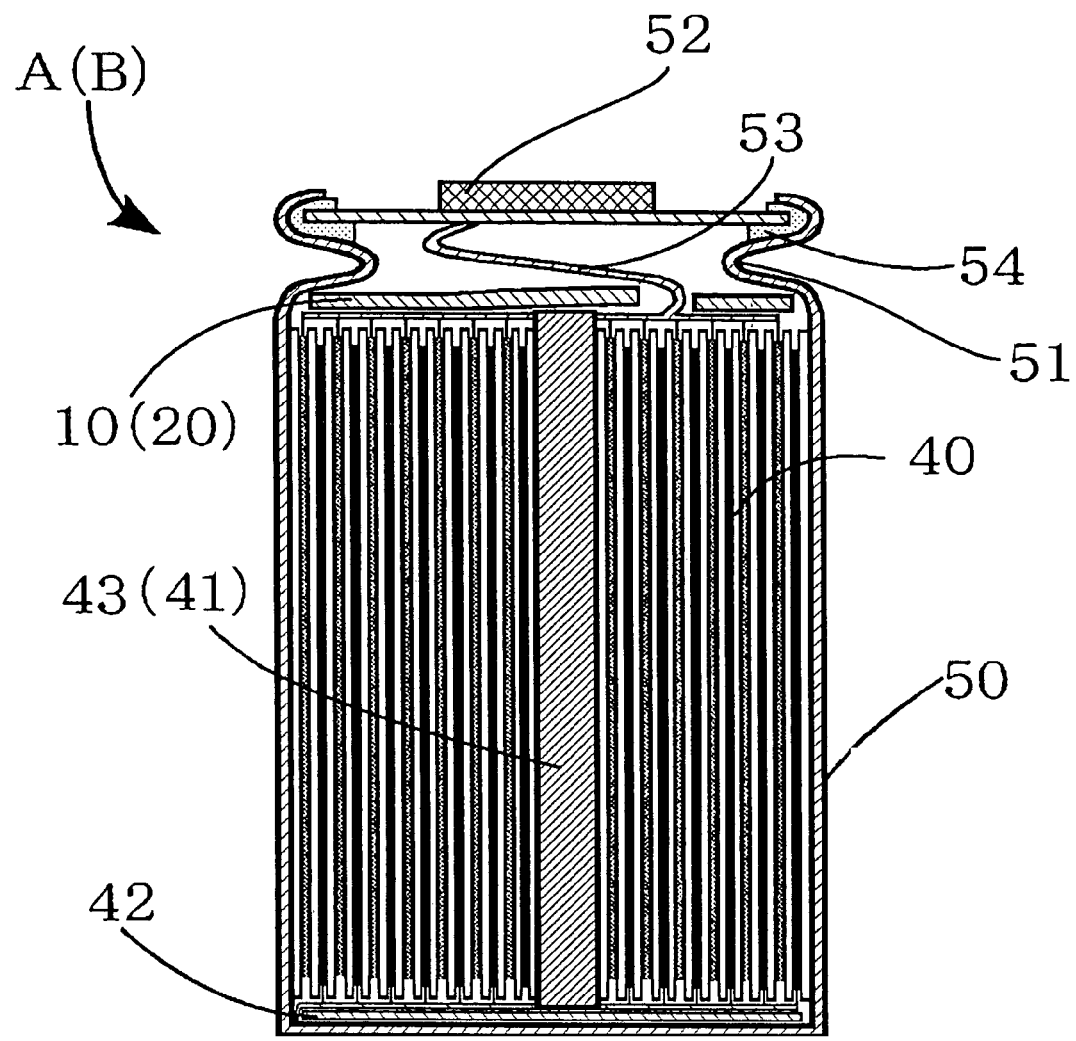
FIG. 4 is a sectional view schematically showing the nonaqueous electrolyte secondary battery which is completed by attaching a sealing member to the outer casing referred to in FIG. 3.

Preferred embodiments of the present invention will be described below with reference to FIGS. 1 to 4. The invention could be made in other specific forms without departing from the spirit and scope thereof, and the embodiments should therefore be considered in all respects as illustrative and not restrictive. FIG. 1 is a plane view schematically showing the circular insulating plate of Example 1 used in the nonaqueous electrolyte secondary battery of the invention, while FIG. 2 is a plane view schematically showing the circular insulating plate of Example 2 used in the nonaqueous electrolyte secondary battery of the invention. FIG. 3 is a sectional view schematically showing the state in which an electrolytic solution is injected into a group of electrodes while the circular insulating plate referred to in FIG. 1 or FIG. 2 is arranged in the upper region of the group of electrodes and inserted into an outer casing. FIG. 4 is a sectional view schematically showing the nonaqueous electrolyte secondary battery which is completed by attaching a sealing member to the outer casing referred to in FIG. 3.

1. Circular Insulating Plate

(1) EXAMPLE 1

A circular insulating plate 10 according to Example 1 is produced by stamping a polypropylene (PP) sheet having a thickness of 0.3 mm. As shown in FIG. 1, the circular insulating plate 10 includes a main body 11, an opening 12, and cut portions 13 and 14. The opening 12 is formed to have the shape of a semicircular arc in the main body 11, which has a diameter of 17 mm. The cut portions 13 and 14 extend from the end portions 12a and 12b, respectively, of an outer periphery of the semicircular arced opening 12.

The semicircular arced opening 12 cut out from the main body 11 is formed to have a radius of 5.5 mm from the center point of the main body 11 except for the semicircular portion thereof which has a radius of 2.5 mm. The cut portion 13 is formed so as to extend in the shape of an arc along the outer periphery of the opening 12 from the end portion 12a of the outer periphery of the semicircular arced opening 12. The cut portion 14 is formed so as to extend in the shape of an arc along the outer periphery of the opening 12 from the end portion 12b of the outer periphery of the semicircular arced opening 12. In this case, each of the cut portions 13 and 14 is cut so as to extend with an arced shape having an angle of 60° in relation to the central point of the main body 11.

(2) EXAMPLE 2

Similar to the circular insulating plate 10 of Example 1, the circular insulating plate 20 of Example 2 is produced by stamping a PP sheet having a thickness of 0.3 mm. As shown in FIG. 2, the circular insulating plate 20 includes a main body 21 with a diameter of 17 mm, a semicircular arced opening 22, and a cut portion 23 in the main body 21. The cut portion 23 extends from an end portion 22a of an inner periphery of the semicircular opening 22.

The semicircular arced opening 22 cut out from the main body 21 is formed to have a radius of 5.5 mm from the center point of the main body 21 except for the semicircular portion thereof which has a radius of 2.5 mm. The cut portion 23 is formed so as to extend from the end portion 22a of the inner periphery of the semicircular arced opening 22. In this case, the cut portion 23 is cut so as to linearly extend from the end portion 22a of the inner periphery of the semicircular arced opening 22 with an angle of 45°.

(3) COMPARATIVE EXAMPLE 1

Figure 5:
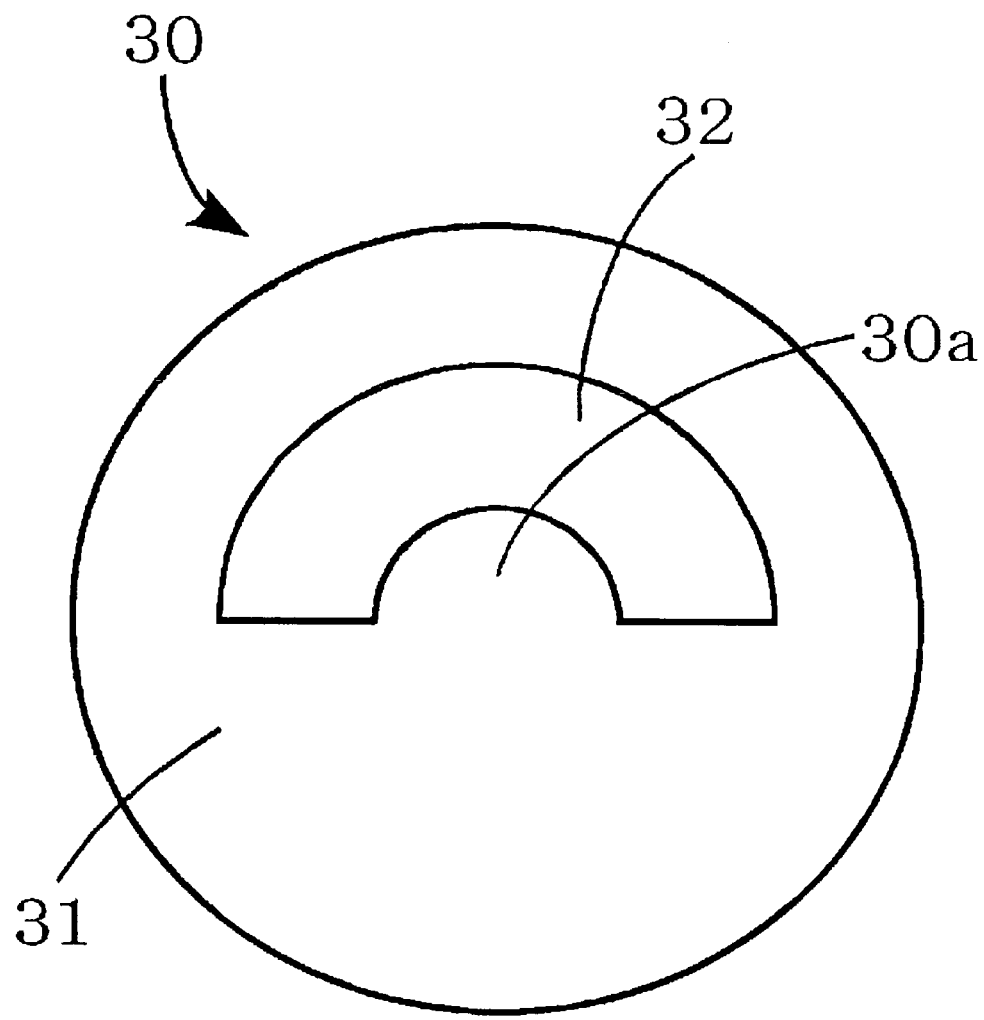
FIG. 5 is a plane view schematically showing the circular insulating plate of the related art (Comparative Example) used in the conventional nonaqueous electrolyte secondary battery.
Figure 6:
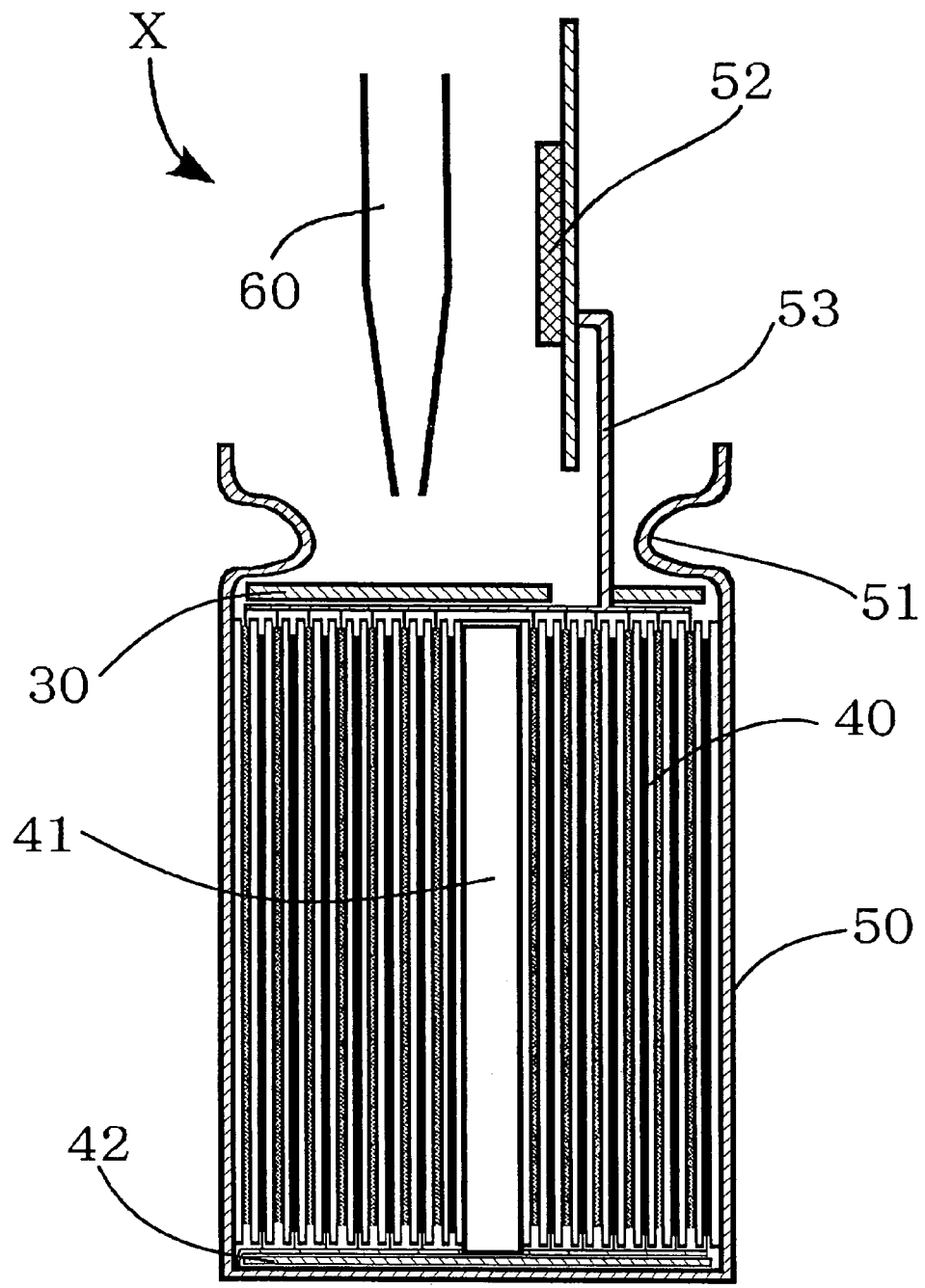
FIG. 6 is a sectional view schematically showing the state in which the electrolytic solution is injected into the outer casing while the circular insulating plate referred to in FIG. 5 is arranged in the upper region of the group of electrodes and inserted into the outer casing.

Similar to the circular insulating plate 10 of Example 1, a circular insulating plate 30 according to Comparative Example 1 is produced by stamping the PP sheet having a thickness of 0.3 mm. As shown in FIG. 5, the circular insulating plate 30 comprises a main body 31 with a diameter of 17 mm and provided with a semicircular arced opening 32 in the main body 31. The semicircular arced opening 32 cut out from the main body 31 is formed to have a radius of 5.5 mm from the center point of the main body 31 except for the semicircular portion thereof which has a radius of 2.5 mm.

2. Nonaqueous Electrolyte Secondary Battery

A positive electrode mixture is prepared by mixing $LiCoO_2$ powder as positive electrode active material, acetylene black as conductive material, and polyvinylidene fluoride (in this case, polyvinylidene fluoride), as binder. The mixing ratio of $LiCoO_2$, acetylene black, and fluororesin is 94:3:3 in terms of mass. N-methyl-2-pyrrolidone (NMP) is added to and mixed with the positive electrode mixture to form slurry. Then, the slurry is applied to both surfaces of a positive electrode current collector (thickness: 15 μm) made of aluminum foil to form a positive electrode mixture layer by means of a doctor blade method or a die coating method. After the slurry has dried, the positive electrode current collector is rolled until a predetermined packing density is obtained, and the positive electrode current collector is cut to a predetermined shape to produce a positive electrode.

On the other hand, to produce a negative electrode, a negative electrode mixture is prepared by mixing graphite (specific surface area: about $3.0 \, m^2/g$) as negative electrode active material, carboxymethyl cellulose (CMC) as a thickening agent, and styrene-butadiene rubber (SBR) as binder. The mixing ratio of graphite, CMC, and SBR is 95:3:2 in terms of mass. Water is added to and mixed with the negative electrode mixture to form slurry. Then, the slurry is applied to both surfaces of a negative electrode current collector (thickness: 10 μm) made of copper foil to form a negative electrode active material layer by means of the doctor blade method or the die coating method. After the slurry has dried, the negative electrode current collector is rolled until a predetermined packing density is obtained, and the negative electrode current collector is cut to a predetermined shape to produce a negative electrode.

Thereafter, the positive electrode and the negative electrode are superposed on each other while sandwiching a separator consisting of a polyethylene fine porous film therebetween, and a spiral electrode group 40 is produced by winding them with a winding apparatus. At this point, a hollow portion 41 from which a winding shaft has been drawn out is formed in the central axis region of the spiral electrode group 40, and a tubular center pin 43 is inserted into the hollow portion 41 (see Japanese Laid-Open Patent No. 2003-229177). Then, while a lower insulating plate 42 made of PP is attached to the bottom surface of the spiral electrode group 40, the circular insulating plate 10 (20 and 30) mentioned above is attached to the upper surface of the spiral electrode group 40, and then the spiral electrode group 40 is inserted into an outer casing 50. In this case, the height from the outer bottom surface of the outer casing 50 to the upper end face of the circular insulating plate 10 (20 and 30) is pre-set at 60.3 mm.

Next, a negative electrode lead (not shown) extending from the negative electrode of the spiral electrode group 40 is welded to the inner bottom surface of the outer casing 50. On the other hand, a positive electrode lead 53 extending from the positive electrode of the spiral electrode group 40 is welded to the lid-like lower surface of a sealing member 52. A disk (not shown) of a groove processing machine is pressed against a certain position (60.0 mm away from the outer bottom surface of the outer casing 50) corresponding to the upper end portion of the circular insulating plate 10 (20 and 30) on a side wall of the outer casing 50, and the disk is rotated to groove while the outer casing 50 is rotated, which allows a grooved portion 51 to be formed at the position corresponding to the upper end portion of the circular insulating plate 10 (20 and 30) on the side wall of the outer casing 50, and to protrude toward the inner portion from the outer portion of the outer casing 50.

At this point, the grooving action produces a grooved portion 51 with a depth (length) of 1.5 mm. The bottom surface (lower surface) of the grooved portion 51 is located in a height of 59.4 mm away from the outer bottom surface of the outer casing 50 due to the grooving action, which causes the outer periphery of the circular insulating plate 10 (20 and 30) to press toward the bottom of the outer casing 50 by 0.9 mm. Accordingly, the central portion of the circular insulating plate 10 (or 20) including the cut portions 13 and 14 (or 23) is raised from the periphery thereof by about 2 mm in the upper region of the hollow area (winding core portion) 41 of the spiral electrode group 40. On the contrary, the upper region of the hollow area (winding core portion) 41 of the spiral electrode group 40 is not raised in the circular insulating plate 30 which is not provided with a cut portion.

Then, a nonaqueous electrolytic solution of only 3.8 ml is injected into the outer casing 50. To form the nonaqueous electrolytic solution, 1 mol/liter $LiPF_6$ is dissolved in admixture solvent (EC:DMC=1:1 in terms of volume at 25° C.) of EC and DMC. While a PP ring gasket (insulated packing) 54 is placed on the aforementioned grooved portion 51 formed on the side wall of the outer casing 50, the sealing member 52 is inserted inside the ring gasket (insulated packing) 54. Then, the upper end portion of the outer casing 50 is sealed by caulking the upper end portion inwardly, and nonaqueous electrolyte secondary batteries A, B, and X are produced, respectively. The nonaqueous electrolyte secondary batteries A, B, and X each have a diameter of 18 mm, height (length) of 65 mm, and design capacity of 2000 mAh.

In this case, the nonaqueous electrolyte secondary battery in which the circular insulating plate 10 is used is identified as battery A, the nonaqueous electrolyte secondary battery in which the circular insulating plate 20 is used is identified as battery B, while the nonaqueous electrolyte secondary battery in which the circular, insulating plate 30 is used is identified as battery X.

3. Injection Property

The nonaqueous electrolytic solution of 3.8 ml is injected into the outer casing 50 in four sets of injections consisting of 1.8 ml, 0.8 ml, 0.7 ml, and 0.5 ml, respectively. After the predetermined amount of nonaqueous electrolytic solution is injected, the period of time within which the nonaqueous electrolytic solution penetrates the spiral electrode group 40 is measured. Table 1 shows the results obtained.

TABLE 1

| Battery Type | Injection Time with Predetermined Injection Amount (sec.) | | | | Total Injection Time (sec.) |
|---|---|---|---|---|---|
| | 1.8 ml | 0.8 ml | 0.7 ml | 0.5 ml | |
| A | 230 | 24 | 36 | 7 | 382 |
| B | 248 | 37 | 117 | 11 | 414 |
| X | 276 | 95 | 132 | 72 | 575 |

As may be gleaned from Table 1, the time involved for the injection process for each of the batteries A and B is shorter compared to that of battery X, in which the circular insulating plate 30 with no cut portion is used. In addition, the penetration speed of the nonaqueous electrolytic solution is faster in respect of the batteries A and B in which the circular insulating plate 10 (or 20) with the cut portions 13 and 14 (or 23) is used. This is attributed to the fact that the circular insulating plate 10 (or 20) with the cut portions 13 and 14 (or 23) ensure that the injected solution will flow in a path leading to the hollow area (winding core portion) 41 of the spiral electrode group 40 by raising the circular insulating plate 10 (or 20) with the cut portions 13 and 14 (or 23) from the periphery thereof at a predetermined height in the upper region of the hollow area (winding core portion) 41 of the spiral electrode group 40.

It is therefore clear that the injection property of the nonaqueous electrolytic solution improves when the circular insulating plate 10 (or 20) with the cut portions 13 and 14 (or 23) is used. The protuberance of the circular insulating plate 10 (or 20) in the upper region of the hollow area (winding core portion) 41 of the spiral electrode group 40 does not obstruct the sealing of the battery after the injection.

What is claimed is:

1. A nonaqueous electrolyte secondary battery in which a grooved portion provided in the upper portion of the outer casing thereof protrudes toward the inner portion of the outer casing, a group of electrodes being housed in the outer casing, a positive electrode and a negative electrode being wound in a spiral manner while facing each other through a separator in the group of electrodes, and a sealing member is placed on the upper portion of the grooved portion through insulated packing to seal the opening of the outer casing in an airtight manner, wherein a circular insulating plate provided with an opening and a cut portion is arranged between the upper region of the said group of electrodes and the lower surface of the said grooved portion, the said cut portion extending from an end portion of the opening, and an inner peripheral side of the cut portion of the circular insulating plate is raised from an outer peripheral side of the cut portion.

2. A nonaqueous electrolyte secondary battery according to claim 1, wherein the opening of the circular insulating plate is formed in the shape of a semicircular arc, and the inner periphery of the opening is formed in such manner as to cover a portion corresponding to the central axis region of the group of electrodes.

3. A nonaqueous electrolyte secondary battery according to claim 2, wherein the cut portion of the circular insulating plate is formed so as to extend radially toward both sides from end portions of the said semicircular arced opening along the outer periphery of the opening.

4. A nonaqueous electrolyte secondary battery according to claim 1, wherein the cut portion of the circular insulating plate is formed so as to linearly extend from one end portion of the inner periphery of the said semicircular arced opening.

5. A nonaqueous electrolyte secondary battery according to claim 1, wherein a tubular center pin is provided in the central axis region of the said group of electrodes.

6. A nonaqueous electrolyte secondary battery producing method in which a sealing member is placed in an upper portion of the outer casing thereof through insulated packing, a group of electrodes being housed in the outer casing, a positive electrode and a negative electrode being wound in a spiral manner while facing each other through a separator in the group of electrodes, and the opening of the outer casing is sealed by caulking to produce a nonaqueous electrolyte secondary battery, the nonaqueous electrolyte secondary battery producing method comprising:

a housing step, whereby the group of electrodes is housed in the outer casing after arranging a circular insulating plate provided with a semicircular arced opening and a cut portion, the semicircular arced opening being located in the upper region of the group of electrodes, and the cut portion extending from an end portion of the semicircular arced opening;

a grooving step, whereby a grooved portion is formed at approximately the same height from the outer bottom surface of the outer casing where the said circular insulating plate is arranged in the upper portion of the outer casing in which the group of electrodes is housed, and the grooved portion protrudes toward the inner portion of the outer casing from the outer portion thereof; and a sealing step of caulking a sealing portion of the outer casing after a sealing member is placed in the upper portion of the grooved portion through insulated packing.

7. A nonaqueous electrolyte secondary battery producing method according to claim 6, wherein the circular insulating plate is formed such that the inner periphery of the opening thereof covers a portion corresponding to the central axis region of the group of electrodes.

8. A nonaqueous electrolyte secondary battery producing method according to claim 6, wherein the circular insulating plate is formed such that the cut portion thereof extends radially toward both sides from end portions of the semicircular arced opening along the outer periphery of the said opening.

9. A nonaqueous electrolyte secondary battery producing method according to claim 6, wherein the circular insulating plate is formed such that the cut portion thereof linearly extends from one end portion of the inner periphery of the semicircular arced opening.

10. A nonaqueous electrolyte secondary battery producing method according to claim 6, wherein a tubular center pin is provided in the central axis region of the group of electrodes.

* * * * *